N. C. Jones,
Label.

No. 80,967.  Patented Aug. 11, 1868.

Witnesses:  Inventor:

United States Patent Office.

NORMAN C. JONES, OF NEW YORK, N. Y.

Letters Patent No. 80,967, dated August 11, 1868.

IMPROVEMENT IN BALE-LABELS.

*The Schedule referred to in these Letters Patent and making part of the same.*

TO ALL WHOM IT MAY CONCERN:

Be it known that I, NORMAN C. JONES, of the city, county, and State of New York, have invented a new and improved Metallic Bale-Tag; and I do hereby declare that the following is a full, clear, and exact description thereof, which will enable those skilled in the art to make and use the same, reference being had to the accompanying drawings, forming a part of this specification.

This invention relates to a new and improved method of marking and insuring the identification of cotton-bales, as well as bales of hemp, manufactured goods, and other commodities, or goods which are usually confined by ropes, hoops, or ties of any kind; and the invention consists in so forming the tag that one or more of the ropes, hoops, or ties shall pass through and confine it to the bale, the name, initials, trade-mark, and weight (one or more of them) being indelibly stamped thereon, as will be hereinafter more fully described.

Similar letters of reference indicate corresponding parts.

Figure 1:
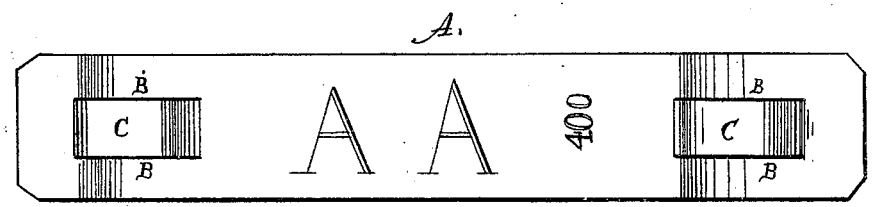
Figure 1 represents a longitudinal side view of the tag, constructed so as to allow two of the ropes or hoops to pass through it.
Figure 2:
Figure 2 is an edge view of the same, showing the manner in which the tag is attached.

In this example of my invention, the tag is shown as designed for two ropes or hoops to pass through, and I prefer this method, although I do not confine myself thereto, as more or less orifices may be made, and more or less in number of the ropes or hoops or bands may pass through the tag.

Any kind of metal may be used for making the tags, but I prefer galvanized iron, as that metal is proof against oxidation and decay from dampness and exposure.

The tag, A, is formed of any desired length and width, and two or more longitudinal slits are made through it.

B represents the slits.

C is the intervening metal between the slits.

D represents the orifice, through which the rope or hoop passes.

The metal, C, between the slits is bent outward, (or inward,) so as to form an orifice, D, sufficiently broad for the rope or hoop, and the tag is attached when the bale is made.

The tag attached in this manner cannot be abstracted without cutting or using great violence, and, in case of damage to the bale by fire or water, or from any other cause, the tag will remain uninjured, and designate with unerring certainty the ownership and weight.

The tags may be stamped, when on the bale, by passing a block or plate of metal beneath it, or they may be stamped before they are attached, as may be found most convenient.

Having thus described my invention, what I claim as new, and desire to secure by Letters Patent, is—

The metallic tag A, when constructed and used substantially as and for the purposes herein shown and described.

The above specification of my invention signed by me, this 24th day of June, 1868.

NORMAN C. JONES.

Witnesses:
E. G. COLLINS,
FRANK BLOCKLEY.